United States Patent
Chang et al.

(10) Patent No.: US 7,041,333 B2
(45) Date of Patent: May 9, 2006

(54) METHOD OF AND APPARATUS FOR MANUFACTURING OPTICAL DISC

(75) Inventors: Do-hoon Chang, Seoul (KR);
Jin-hwan Kim, Gyeonggi-do (KR);
Myong-do Ro, Gyeonggi-do (KR);
Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 10/189,180

(22) Filed: Jul. 5, 2002

(65) Prior Publication Data

US 2003/0021888 A1   Jan. 30, 2003

(30) Foreign Application Priority Data

Jul. 5, 2001   (KR) ............................... 2001-40051

(51) Int. Cl.
*B05D 3/00*   (2006.01)
*B05D 3/12*   (2006.01)
*B05D 5/06*   (2006.01)

(52) U.S. Cl. ...................... 427/162; 427/240; 427/553; 427/558; 427/559

(58) Field of Classification Search ................ 427/162, 427/553, 558, 289, 240
See application file for complete search history.

(56) References Cited

U.S. PATENT DOCUMENTS 6,349,086 B1 *   2/2002   Nishida et al. ............. 369/280
2001/0046203 A1   11/2001   Kashiwagi et al.

FOREIGN PATENT DOCUMENTS

| JP | 10-040584   | * | 2/1998 |
| JP | 10-289489   |   | 10/1998 |
| JP | 11-086355   | * | 3/1999 |
| JP | 11-86355    |   | 3/1999 |
| JP | 11-086356   | * | 3/1999 |
| JP | 11-203724   |   | 7/1999 |
| JP | 2002-237105 |   | 8/2002 |

* cited by examiner

*Primary Examiner*—Brian K. Talbot
(74) *Attorney, Agent, or Firm*—Stein, McEwen & Bui, LLP

(57) ABSTRACT

A method of manufacturing an optical disc includes easily removing a bump formed on a circumference of the optical disc during forming a transparent layer by using a spin-coating method to form the optical disk having a high-density recording capacity. The method includes preparing a substrate having a diameter larger than that of a desired disc, applying an ultraviolet hardening resin to the substrate and forming a transparent layer having a predetermined thickness by a spin-coating method, illuminating an ultraviolet ray on the transparent layer and a bump formed on a circumference of the transparent layer to be hardened, and cutting out the bump by using a puncher. According to the method, the bump which inevitably occurs when the transparent layer is formed, can be easily cut out by a puncher.

22 Claims, 4 Drawing Sheets

METHOD OF AND APPARATUS FOR MANUFACTURING OPTICAL DISC

CROSS-REFERENCE TO RELATED APPLICATIONS

This application claims the benefit of Korean Patent Application No. 2001-40051, filed Jul. 5, 2001, in the Korean Industrial Property Office, the disclosure of which is incorporated herein by reference.

BACKGROUND OF THE INVENTION

1. Field of the Invention

The present invention relates to a method of and an apparatus for manufacturing an optical disc, and more particularly, to a method of and apparatus for manufacturing an optical disc which has a high-density recording capacity and in which a bump formed along a circumference of the optical disc during forming a transparent layer by a spin-coating method can be easily removed.

2. Description of the Related Art

In general, an optical disc is extensively and widely used as an information recording medium in an optical pickup apparatus to which information is recorded in and reproduced from in a non-contact manner. The optical disc has one of two types according to its information recording capacity: a compact disc (CD) and a digital versatile disc (DVD). Especially, an increase in the quantity of the information to be recorded triggers a development in the DVD having a high-density and large capacity.

A spot diameter of a laser beam used in recording/reproducing the information on/from the optical disc is conventionally reduced to increase a recording density of the optical disc. This is based on the principle that the smaller a wavelength λ of the laser beam is and the larger a numerical aperture NA of an objective lens is, the smaller the spot diameter r of the laser beam. The spot diameter r is expressed by the following equation (1):

$$r \propto \frac{\lambda}{NA}$$

In conclusion, the wavelength of the laser beam must be shorter and the numerical aperture of the objective lens must be larger in order to realize a high-density optical disc. For this reason, a range of lasers from 650 nm red laser to 480 nm blue laser are available as the laser beam and the numerical aperture of the objective lens can be adjusted in the range of 0.5~1.5 NA.

However, there is a limitation in enlarging the numerical aperture of the objective lens and reducing the wavelength of the laser beam. That is, during reproducing a recorded signal, a degradation $W_{31}$ of the reproduced signal is in proportion to the cube of the numerical aperture $NA^3$ and a thickness d of the optical disc and is in inverse proportion to the wavelength λ of the laser beam. This is expressed by the following equation (2):

$$W_{31} \propto \frac{d \cdot NA^3}{\lambda}$$

From the equation (2), it is noted that if the wavelength λ of the laser beam is shorter and the numerical aperture NA of the objective lens is larger, the spot diameter of the laser beam becomes smaller, but the aberration thereof becomes remarkably increased, thereby degrading characteristics of the reproduced signal. Accordingly, the aberration of the laser beam must be reduced to increase the recording density by adjusting the numerical aperture of the objective lens and the wavelength of the laser beam.

It is required to form a substrate to be thinner so as to increase the recording density of the optical disc and reduce the aberration of the laser beam. Thus, the DVD is made of two pieces each having a 0.6 mm substrate to have the same thickness of 1.2 mm as the CD to achieve a compatibility between the CD and the DVD. Also, the DVD is recently manufactured to have a two-piece or three-piece structure using two or three pieces each having a substrate of 0.3 or 0.4 mm.

Furthermore, in an optical disc shown in FIG. 1, a thickness T of a protective substrate 10 is 1.1 mm, and a thickness d of a transparent layer 15 is 0.1 mm. That is, a total thickness of the optical disc becomes 1.2 mm. Here, a spin-coating method is used for making the 0.1 mm transparent layer 15. According to the spin-coating method, a liquid ultraviolet-hardening resin 13 is applied around a center of the protective substrate 10, which is rotated at a low speed, as shown in FIG. 2. Then, the protective substrate 10 is rotated at a high speed. As a result, the ultraviolet-hardening resin 13 is spread out in a radial direction of the protective substrate 10 due to a centrifugal force, thereby coating the entire protective substrate 10 with the ultraviolet-hardening resin 13. Thereafter, an ultraviolet ray is illuminated on the entire protective substrate 10 to harden the ultraviolet-hardening resin 13 to form the transparent layer 15.

However, high polymer such as the ultraviolet-hardening resin 13 is a viscous-elasticity material that has viscosity and elasticity. Elasticity is a property of the polymer that is transformed due to a stress applied thereon, but it returns to its original state by a removal of the stress according to Hooke's law. Thus, referring to FIG. 1, when the transparent layer 15 is formed by the spin-coating method, a lump 15a of the ultraviolet-hardening resin 13 is formed along the circumference of the optical disc due to the elastic property of the ultraviolet-hardening resin 13 after the protective substrate 10 is rotated at a high speed. The lump 15a of the ultraviolet-hardening resin 13 is hardened as it is and becomes a hilly spot that is called the bump 15a when the ultraviolet ray is illuminated on the transparent layer 1. A central hole 14 is formed in the protective substrate 10 to be used in chucking the optical disc.

Meanwhile, a region in which information is recorded on the optical disc is reduced by a width w of the bump 15a due to an area occupied by the bump 15a. A DVD-RAM format prescribes that a data region in which user data is recorded is 57.9 mm in a diametric direction of the optical disc and a read-out region in which disc data is recorded is 58.5 mm in the diametric direction of the optical disc. This is understood that the read-out region in which the disc data is recorded must be 58.5 mm in the diametric direction of the optical disc which must have at least 117 mm in the diametric direction of the optical disc. However, when a 0.1 mm transparent layer is formed by the spin-coating method as described above, the width w of the bump 15a appears to be larger than 1.5 mm in any case when the thickness of the transparent layer 15 was about 0.1 mm, i.e., 100 μm.

The above experimental result is illustrated in FIG. 3, wherein a horizontal axis denotes the thickness d of the transparent layer 15, and a vertical axis denotes the width w of the bump 15a. FIG. 3 reveals that the width w of the bump 15a is larger than 1.5 mm in most cases if the thickness of the transparent layer 15 is about 100 μm. Therefore, both ends of the optical disc formed with the bumps 15s each having the width w occupies more than 3 mm in the radial direction of the optical disc. For this reason, given that the entire diameter of the protective substrate 10 is n, the information recording capacity of the optical disc is reduced by twice the width w of the bump 15a, and thus, the maximum recording region is substantially reduced to a portion indicated by m in FIG. 1.

Further, given that a height of the bump 15a is h, there is a possibility that a front end of an objective lens (not shown) collides with the bump 15a during recording or reproducing the information on or from the optical disc by an optical pickup apparatus if a distance between the objective lens and the optical disc is shorter than h of the bump 15a which is formed as described.

Therefore, various methods to remove the bump 15a have been devised. For example, the protective substrate 10 is planarized by blowing wind to a circumferential direction of the ultraviolet hardening resin 15 from the center of the protective substrate 10 before the hardening of the ultraviolet hardening resin 15, thereby preventing the occurrence of the bump 15a. However, in this case, since the planarization of the surface of the protective surface 10 is performed before the hardening of the ultraviolet hardening resin 15, a surface of the protective substrate 10 may not become flat but irregular by the wind.

Otherwise, as shown in FIG. 4, after the hardening of the ultraviolet hardening resin 15, the bump 15a formed along the circumference of the protective substrate 10 is trimmed by a trimming tool 25 being rotated by a rotating unit 20. However, this method is also disadvantageous in that it takes a long time to perform a trimming process and the protective substrate 10 is easily polluted by fine dust generated during the trimming process, thus causing the degradation of the recording/reproducing characteristics of the optical disc.

SUMMARY OF THE INVENTION

To solve the above and other problems, it is an object of the present invention to provide a method of manufacturing an optical disc having excellent recording/reproducing characteristics and having high-density recording capacity by cutting bumps occurring when a transparent layer is formed by a spin-coating method.

Additional objects and advantageous of the invention will be set forth in part in the description which follows and, in part, will be obvious from the description, or may be learned by practice of the invention.

To achieve the above and other objects, there is provided a method of manufacturing an optical disc, the method including preparing a substrate having a diameter larger than that of a desired disc, applying an ultraviolet hardening resin to the substrate and forming a transparent layer having a predetermined thickness by a spin-coating method, illuminating an ultraviolet ray on the transparent layer and a bump formed on a circumference of the transparent layer to be hardened, and cutting away the bump by using a puncher.

Here, a diameter of the substrate is approximately 124 mm.

The substrate comprises an edge region to be cut away during the cutting of the bump, and an inner border of the edge region is formed to be thinner than a thickness of a center portion of the substrate.

The inner border of the edge region is located at or inside the inner border of the bump.

A thickness of the inner border of the edge region is no more than 0.3 mm.

The predetermined thickness of the transparent layer is no more than 0.1 mm.

The method further includes forming a central hole on the substrate on which the transparent layer is hardened.

The cutting of the bump includes preparing a holder having a protrusion on its center and inserting the protrusion into the central hole of the substrate.

The puncher includes a groove corresponding to the protrusion of the holder.

The puncher includes a circumferential cutter corresponding to the inner border of the edge region.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
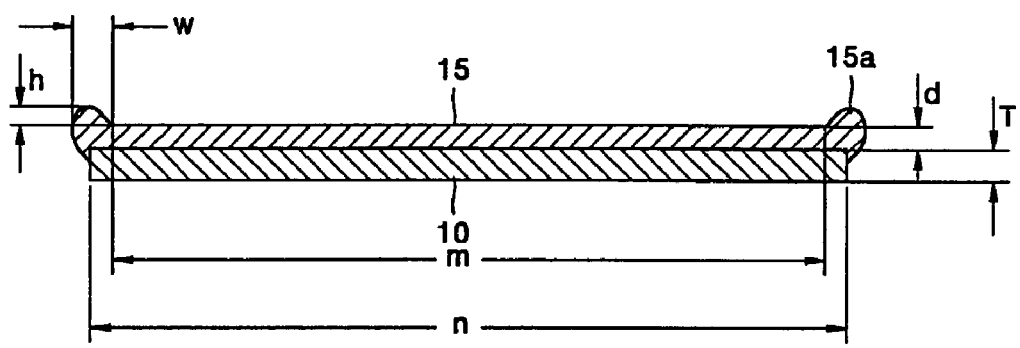
FIG. 1 is a cross-sectional view of bumps formed on a circumference of a conventional optical disc that is manufactured by a spin-coating method.
Figure 2:
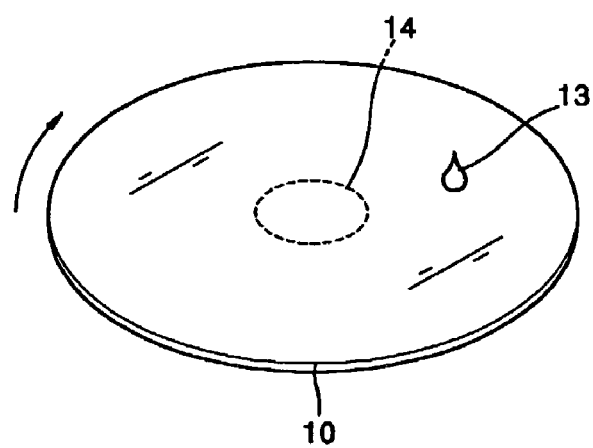
FIG. 2 is a view explaining the spin-coating method of forming a transparent layer of the optical disc of FIG. 1.
Figure 3:
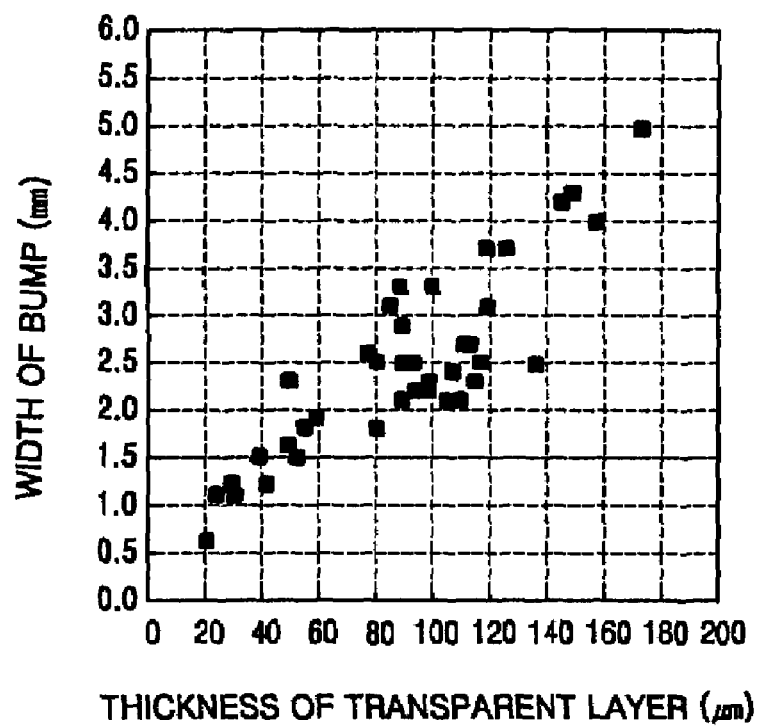
FIG. 3 is a graph of a variation in a width of a bump according to a thickness of the transparent layer of the optical disc of FIG. 1.
Figure 4:
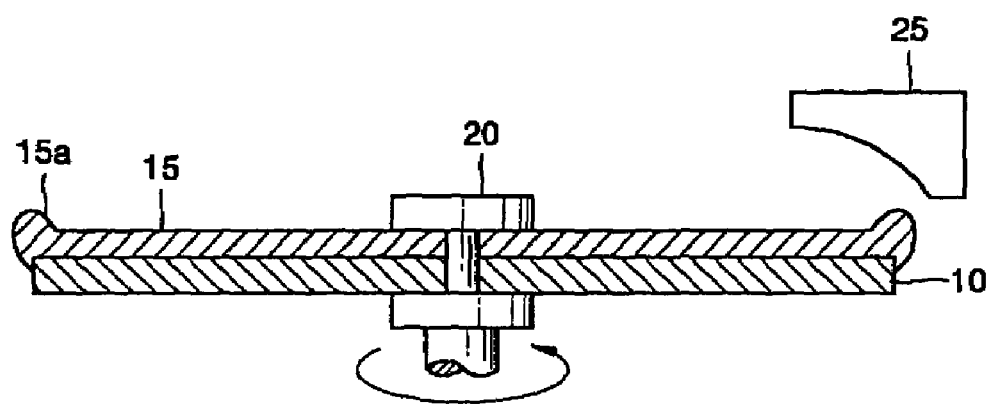
FIG. 4 is a view explaining a method of removing the bump formed on the circumference of the optical disc manufactured by the spin-coating method of FIGS. 1 and 2.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 5:
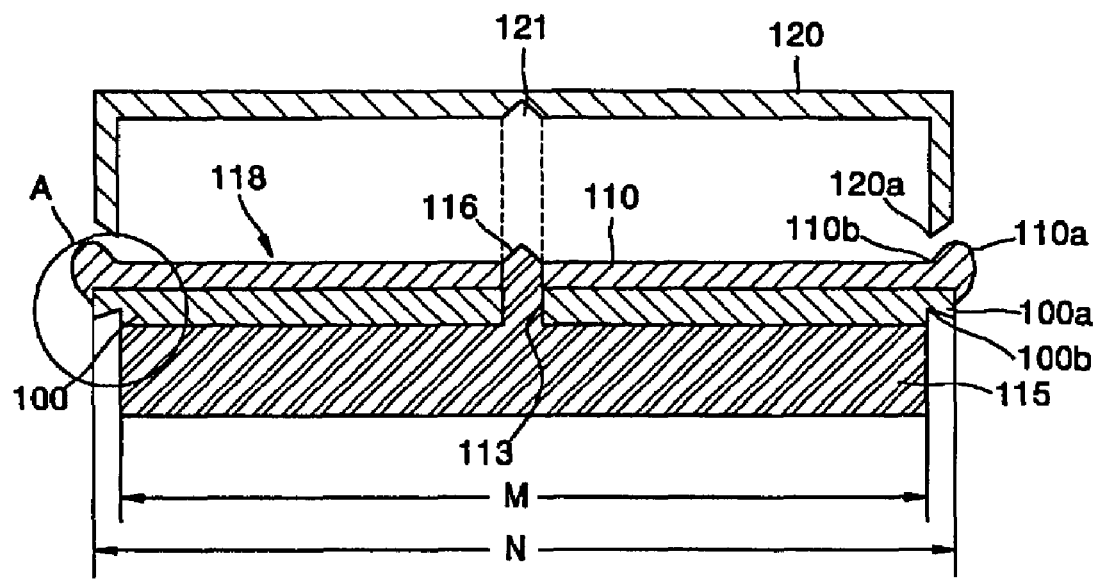
FIG. 5 is a cross-sectional view explaining a method of removing a bump formed on a circumference of a substrate of an optical disc made by a spin-coating method according to an embodiment of the present invention.

In a method of manufacturing an optical disc according to an embodiment of the present invention with reference to FIG. 5, a substrate 100 formed to have a predetermined thickness and a diameter larger than that of a desired optical disc is prepared, an ultraviolet hardening resin (not shown) is applied to the substrate 100, the substrate 100 is rotated at a high speed, the ultraviolet hardening resin is hardened to form a transparent layer 110 having a bump 110a on its circumference, and the bump 110a is cut out to form the desired optical disc.

During the preparation of the substrate 100, given that the diameters of the desired optical disc and the substrate 100 are M and N, respectively, M must be smaller than N. Here, a difference of N and M denotes a size of an edge region 100a which is to be cut out during the cutting of the bump 110a. It is possible that N is 124 mm when M is 120 mm. The substrate 100 is formed by an injection molding method, and a thickness of the substrate 100 may be less than or equal to about 1.1 mm. A thickness of the transparent layer 110 may be less or equal to about 0.1 mm.

Figure 6:
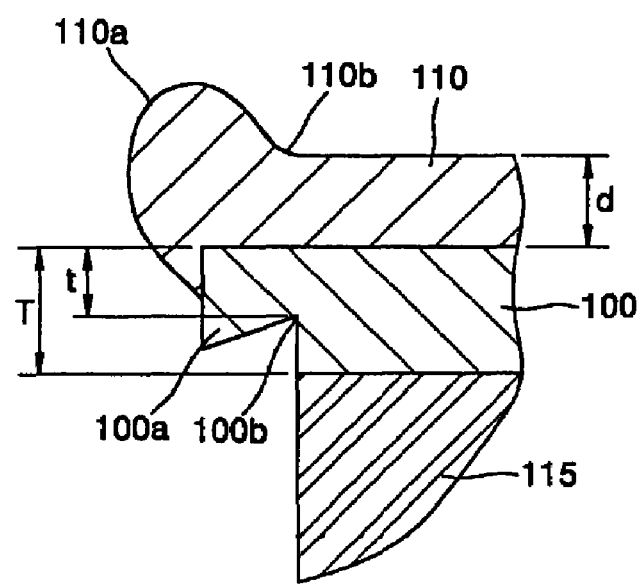
FIG. 6 is an enlarged view of the bump and the substrate of the optical disc indicated by a portion A of the FIG. 5.
Figure 7:
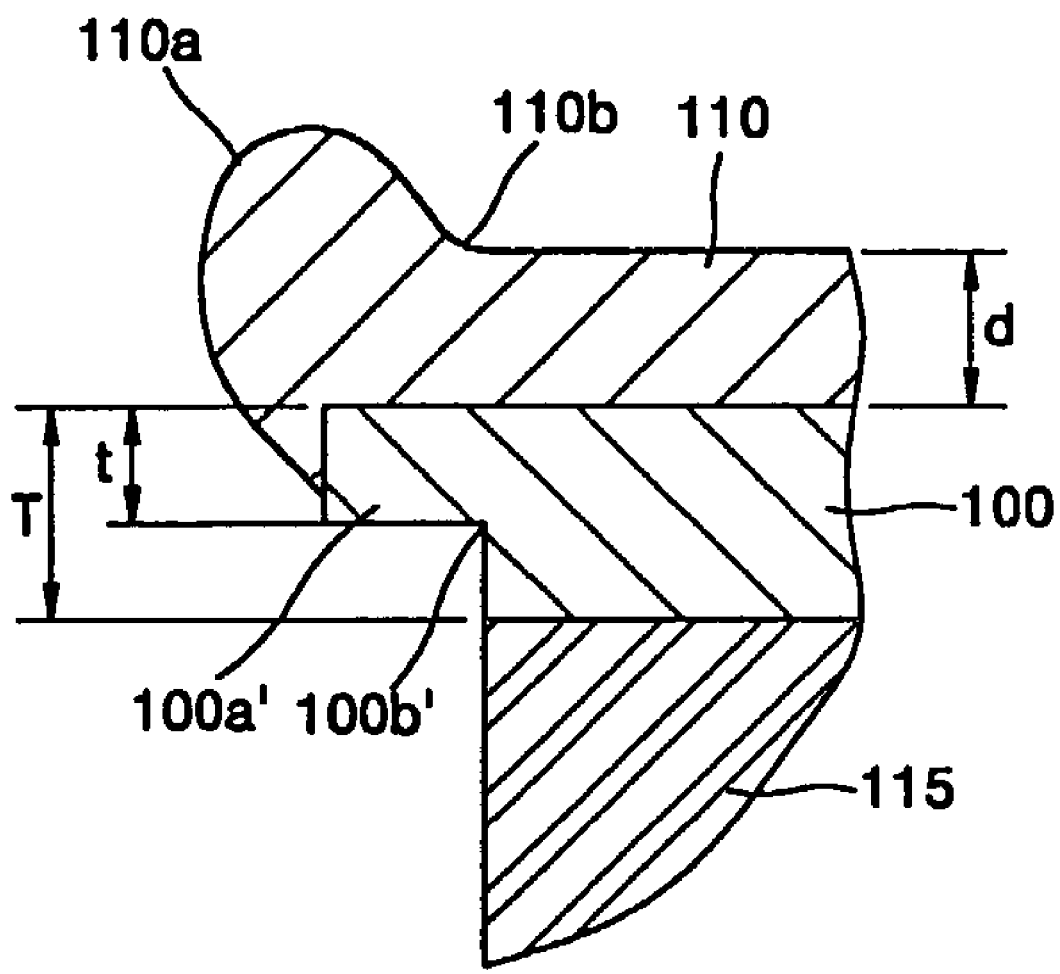
FIG. 7 is a view of another type of the bump and the substrate according to another embodiment of the present invention.

Referring to FIG. 6, an inner border 100b of the edge region 100a is formed between the edge region 100a and a desired disc portion of the substrate 100 to be thinner than a thickness T of a center portion of the substrate 100 so that a minimum force is needed to cut out the bump 110a, thereby preventing the bending of the disc, or any modification or destruction of information recorded on the optical disc. A thickness t of the inner border 100b is is preferably no more than 0.3 mm. Also, the thickness t of the edge region 100a may be thicker than that of the inner border 100b. Otherwise, as shown in FIG. 7, the thickness t of the edge region 100a' may be the same as that of the inner border 100b'. As described above, if the inner border 100b or 100b', which is to be cut out away later, is formed as thin as possible, the bump 110a can be easily cut away, thereby reducing an inferiority rate of the optical disc.

Next, the transparent layer 110 is formed on the substrate 100 by the spin-coating method. The spin-coating method has already been described above and therefore, an explanation thereof will be omitted here. As previously mentioned, the bump 110a is formed on the circumference of the transparent layer 110 by the spin-coating method. The width of the bump 110a may vary depending on the viscosity of the ultraviolet hardening resin, the thickness of the transparent layer 110 and a rotation time and speed of the substrate 100. Here, a reference numeral 118 denotes a substrate on which the transparent layer 110 is formed and hardened. And another reference numeral 113 denotes a central hole formed at the center portion of the substrate 118, which is used in chucking the optical disc. In other words, the optical disc is loaded on an optical pickup apparatus with its central hole 113 inserted into a protrusion 116 to reproduce the information recorded thereon.

During the cutting of the bump 110a, a holder 115 is prepared to hold the substrate 118 having the hardened transparent layer 110. The holder 115 may include the protrusion 116, which fits the central hole 113, to place the substrate 118 thereon. The protrusion 116 is inserted into the central hole 113 of the substrate 118 having the hardened transparent layer 110 and the bump 110a is cut away by a puncher 120 including a groove 121 at a position corresponding to the protrusion 116. It is possible to correctly locate a portion to be cut away by putting the protrusion 116 into the groove 121.

Meanwhile, it is recommended that the inner border 100b or 100b' of the edge region 100a, the inner border 110b of the bump 110a and a cutter 120a of the puncher 120 be located in the same line during the cutting process. Here, the puncher 120 may include the cutter 120a to correspond to the inner border 110b of the bump 110a. The cutter 120a may conform to a circumference of the same circle as a shape of the disc.

However, when performing the spin-coated method, the inner border 100b of the edge region 100a is prone to be at an odd angle from the inner border 110b of the bump 110a according to working conditions. The odd angle means that the inner border 110b of the bump 110a may not be consistent with an inner border 100b of the edge region 100a. In this case, the inner border 110b of the bump 110a must be located outside the inner border 100b or 100b' of the edge region 100a. In other words, the inner border 100b or 100b' of the edge region 100a is located at or inside the inner border 110b of the bump 110a. Then, the cutter 120a is placed to correspond to the inner border 100b or 100b' of the edge region 100a. Next, the cutter 120a is set to the inner border 100b or 100b' of the edge region 100a to cut the bump 110a. At this time, the inner border 100b or 100b' of the edge region 100a can be easily cut out because the thickness of the inner border 100b or 100b' is relatively thinner than other portions of the substrate 100.

Once the edge region 110a including the bump 100a is removed as described above, it is possible to complete an optical disc having a diameter M without deteriorating the recording and/or reproducing characteristics thereof.

With this method of manufacturing an optical disc according to the present invention, it is possible to easily cut out a bump inevitably occurring when a transparent layer is formed by a spin-coating method, without deteriorating the recording and/or reproducing characteristics of the optical disc. Also, an unused portion of a substrate due to a bump is available by the removal of the bump, thereby increasing a recording capacity of the optical disc.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of manufacturing an optical disc, the method comprising:
   forming a substrate having a center portion and an edge region, wherein a thickness of the edge region is less than a thickness of the center portion of the substrate and is uniform in a radial direction of the substrate from an inner border of the edge region to an outer border of the edge region;
   spin-coating an ultraviolet hardening resin on a first surface of the substrate to form a transparent layer having a predetermined thickness;
   illuminating an ultraviolet ray on the transparent layer and the bump formed on a circumference of the transparent layer to harden the transparent layer and the bump; and
   cutting out the bump and the edge region to form the optical disc.

2. The method of claim 1, wherein a diameter of the outer border of the edge region is about 124 mm and a diameter of the inner border of the edge region is about 120 mm.

3. The method of claim 1, wherein a diameter of the inner border of the edge region is less than a diameter of an inner border of the bump.

4. The method of claim 1, wherein a thickness of the edge region is no more than 0.3 mm.

5. The method claim 1, wherein a thickness of the transparent layer is no more than 0.1 mm.

6. The method of claim 5, further comprising:
   forming a central hole in the substrate on which the transparent layer is hardened.

7. The method of claim 6, wherein the cutting out of the bump comprises:
   preparing a holder having a protrusion formed on a center of the holder and inserting the protrusion into the central hole; and
   cutting out the bump and the edge region using a puncher.

8. The method of claim 7, wherein the puncher comprises:
   a groove corresponding to the protrusion.

9. The method of claim 8, wherein the puncher comprises:
a circumferential cutter to correspond to the inner border of the edge region.

10. A method of manufacturing an optical disc, the method comprising:
forming a substrate having a center portion and an edge region, wherein a thickness of the edge region is less than a thickness of the center portion of the substrate and becomes greater in a radial direction of the substrate from an inner border of the edge region to an outer border of the edge region;
forming a transparent layer on the center portion of the substrate and a bump on a circumference of the transparent layer; and
cutting out both the edge region of the substrate and the bump of the transparent layer to form the optical disc.

11. The method of claim 10, wherein the forming of the transparent layer and the bump comprises:
forming the bump to have an inner border with a radius greater than a radius of the inner border of the edge region.

12. The method of claim 10, wherein the forming of the transparent layer and the bump comprises:
forming the transparent layer having a uniform thickness on the center portion of the substrate.

13. The method of claim 10, wherein the forming of the transparent layer and the bump comprises;
forming the bump and a portion of the transparent layer on the edge region of the substrate.

14. The method of claim 10, wherein the bump is not formed on the center portion of the substrate.

15. The method of claim 10, wherein the cutting out the edge region and the bump comprises:
cutting out the edge region by using a cutter having a same circular shape as the substrate.

16. A method of manufacturing an optical disc, the method comprising:
forming a substrate having a center portion and an edge region, wherein a thickness of the edge region is less than a thickness of the center portion of the substrate;
forming a transparent layer on the center portion of the substrate and a bump on a circumference of the transparent layer; and
cutting out both the edge region of the substrate and the bump of the transparent layer to form the optical disc;
wherein:
the forming of the substrate comprises:
forming the edge region having the thickness becoming greater in a radial direction of the substrate from an inner border of the edge region to an outer border of the edge region; and
the cutting out the edge region and the bump comprises:
cutting out the edge region and the bump along the inner border of the edge region.

17. A method of manufacturing an optical disc, the method comprising:
forming a substrate having a center portion and an edge region, wherein a thickness of the edge region is less than a thickness of the center portion of the substrate from an inner border of the edge region to an outer border of the substrate;
spin-coating and hardening a resin onto a first surface of the substrate to form a transparent layer, accumulating any excess resin in an area corresponding to the edge region; and
cutting off the edge region and the accumulated excess resin to form the optical disc.

18. The method of claim 17, wherein a thickness of the edge region is uniform from the inner border of the edge region to the outer border of the substrate.

19. The method of claim 17, wherein:
the thickness of the edge region becomes greater in a radial direction of the substrate from the inner border of the edge region to the outer border of the substrate.

20. The method of claim 18, wherein a thickness of the edge region is about one-fourth of a thickness of the formed disc.

21. The method of claim 17, wherein a difference between a diameter of the outer border of the substrate and a diameter of the inner border of the edge region is about 4 mm.

22. The method of claim 17, wherein:
the forming of the substrate further comprises forming a center hole in the substrate; and
the cutting off of the edge region and the excess resin comprises:
placing the resin coated substrate on a circular holder having a central protrusion, engaging the central protrusion with the center hole of the substrate, and cutting off the edge region and the accumulated excess resin using a puncher which engages the resin coated substrate.

* * * * *

UNITED STATES PATENT AND TRADEMARK OFFICE
CERTIFICATE OF CORRECTION

PATENT NO. : 7,041,333 B2 Page 1 of 1
APPLICATION NO. : 10/189180
DATED : May 9, 2006
INVENTOR(S) : Do-hoon Chang et al.

It is certified that error appears in the above-identified patent and that said Letters Patent is hereby corrected as shown below:

Column 6, line 42, change "the bump" to -- a bump --

Signed and Sealed this

Thirteenth Day of November, 2007

JON W. DUDAS
*Director of the United States Patent and Trademark Office*